Figure 1:
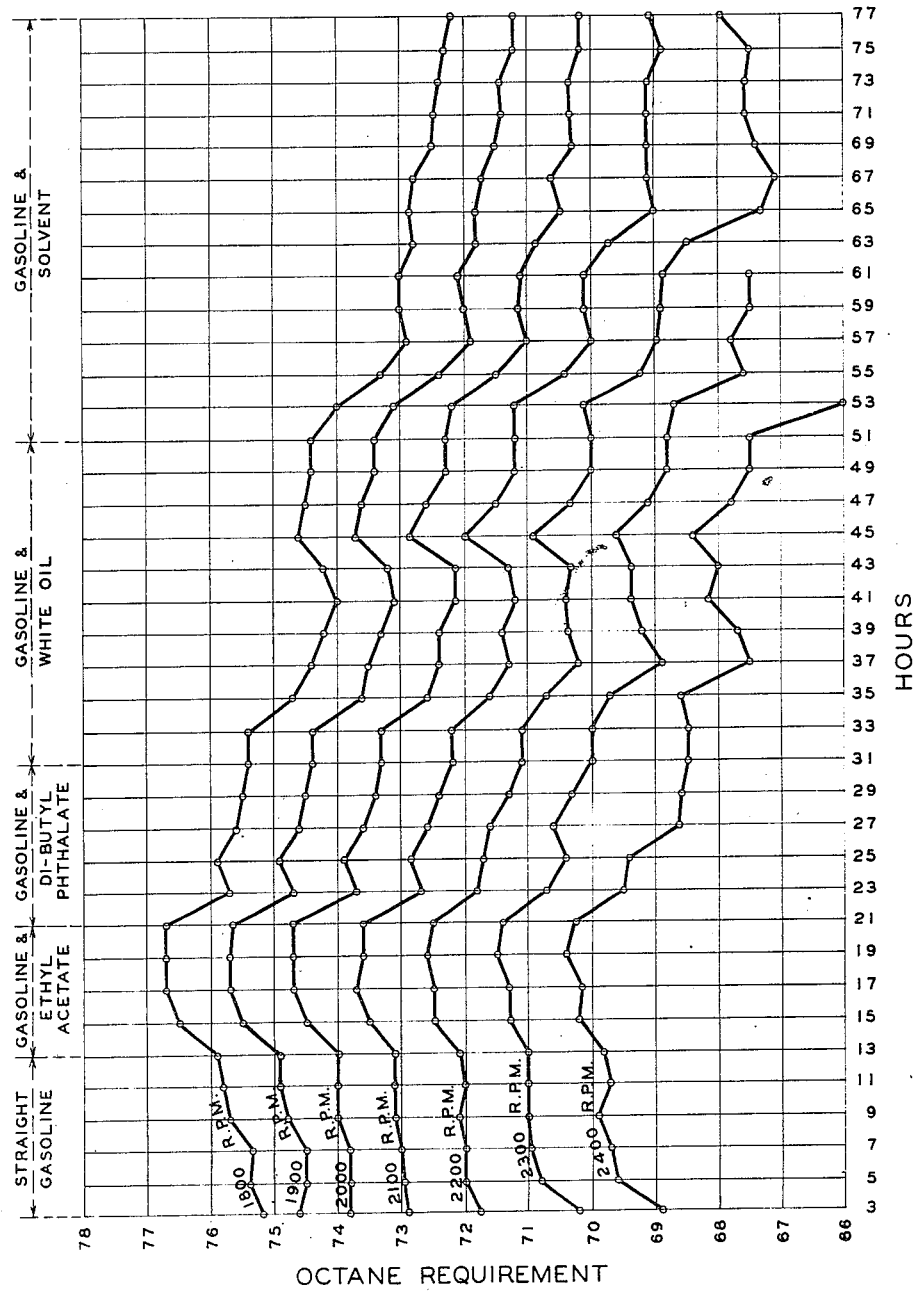

Dec. 2, 1941.        W. J. BACKOFF ET AL        2,264,964
COMPOSITION FOR TREATING MOTORS AND FOR ADDITION TO MOTOR FUEL
Filed July 29, 1940        2 Sheets-Sheet 1

INVENTORS.
William J. Backoff
BY Norman D. Williams   Harry L. Moir
John F. O'Laughlin   John S. Yule Edward W. Lang   ATTORNEY.

Patented Dec. 2, 1941

2,264,964

UNITED STATES PATENT OFFICE 2,264,964

COMPOSITION FOR TREATING MOTORS AND FOR ADDITION TO MOTOR FUEL

William J. Backoff and Norman D. Williams, Chicago, John F. O'Loughlin, Winnetka, Harry L. Moir, Niles Center, and John S. Yule, Chicago, Ill., assignors to The Pure Oil Company, Chicago, Ill., a corporation of Ohio Application July 29, 1940, Serial No. 348,164

29 Claims. (Cl. 44—9)

This application is a continuation-in-part of our application Serial No. 233,613, filed October 6, 1938, and entitled "Motor fuel compositions."

This invention relates to the method of removing gum and carbonaceous deposits from mechanical parts, particularly internal combustion engines, and to novel compositions useful in connection therewith.

In the operation of internal combustion engines there is invariably formed as a result of the conditions of combustion, a deposit in the combustion chamber of the cylinders, on the piston heads, around the valves and also on the spark plugs, which materially interferes with proper and efficient operation of the motor. In the combustion zone the deposit causes what is commonly known as knocking or predetonation of the fuel charge in the cylinders. Similar deposits cause the piston rings and valves to stick. This deposit is commonly referred to as carbon, although it is not composed wholly of carbon but includes other material as mineral matter from road dust drawn into the carburetor, metallic particles, gum and rust, etc. The so-called carbon element of the deposit is largely a result of incomplete combustion of fuel and carbonization of mineral oil. The incomplete combustion of fuel not only accounts for carbon deposition but undoubtedly also accounts for a deposit of gum-like material as well, which under the prevailing conditions may be in a form ranging from a fairly soft gum to a hard, brittle varnish-like substance. For purposes of convenience, the deposits of materials in internal combustion engines, described in the foregoing paragraph, will be referred to as carbon deposits.

It has also been noted that motor fuels such as the usual gasolines now on the market, form a deposit of a gum-like residue in the intake system of internal combustion engines. This deposit is usually most noticeable in the intake manifold and around the intake valves, and is generally referred to as gum. This deposition of gum is very objectionable and may be the cause of the improper functioning, or failure to function, of the intake valves whereby the operating efficiency is materially impaired.

It is an object of this invention to provide a method for removing the gum and carbonaceous deposits from mechanical parts, particularly from the intake and combustion zones of internal combustion engines.

It is another object of the invention to provide a composition capable of removing gum and carbonaceous deposits from mechanical parts, particularly the intake and combustion zones of internal combustion engines.

It is a further object of this invention to provide a composition which is adapted to be used in conjunction with gasoline or other fuels in internal combustion engines. When this gasoline-solvent fuel mixture is used in internal combustion engines, it effectively minimizes the tendency toward formation of carbon and gum deposits in both the intake system and combustion zone and in those engines where deposits of carbon and gum are already present and are interfering with efficient operation, the deposits are substantially decreased and/or removed, restoring the engine to higher operating efficiency.

Still another object of our invention is to provide a material which may be used in conjunction with lubricating oils to reduce, minimize and remove carbon and gum deposits from internal combustion engines and from machinery in general where such deposits have a tendency to occur.

Further objects of the invention will appear from the following description when considered in connection with the accompanying drawings of which—

Figure 2:
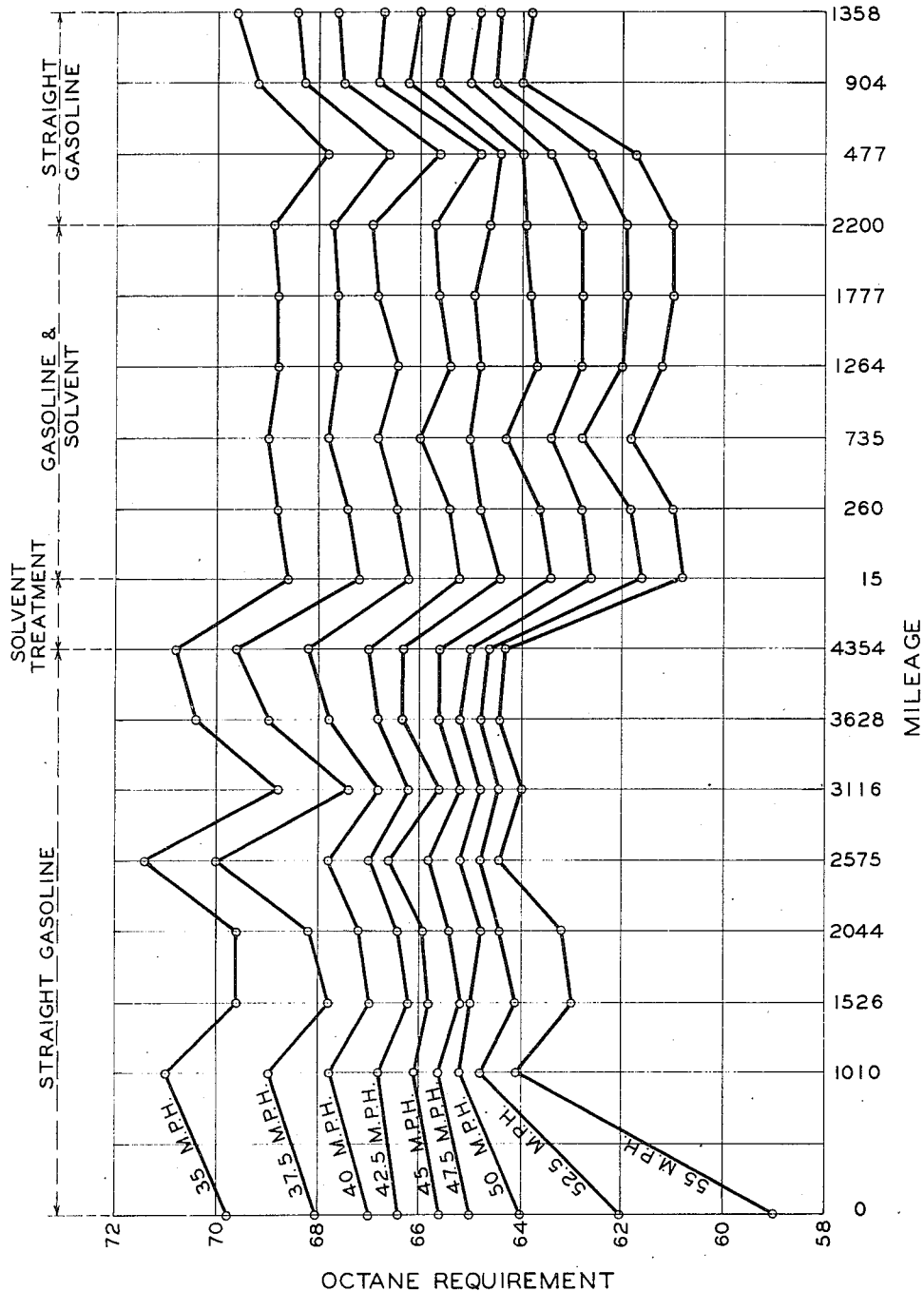

Figure 1 is a graph illustrating by means of curves, the affect, on octane requirement of an automotive engine, of the ingredients used in our novel solvent compositions; and Figure 2 is a graph illustrating by means of curves, the ability of our novel solvents to reduce the octane requirement of an automobile engine and to hold down the octane requirement when added to motor fuel.

It is known that a number of substances have been used in the past with some degree of success to remove or prevent deposits of carbon and gum in internal combustion engines. As a result of laboratory investigation and of commercial usage, it has been found that the materials disclosed in the prior art fail to effectively remove the deposits from either the intake system or the combustion zone. These materials, although possibly producing a slight improvement in engine operating conditions, are unsatisfactory for the reason that removal or prevention of carbon deposits and gum in both the intake and combustion system is not effected.

In an effort to overcome the deficiencies of the earlier carbon and gum removing agents, frequently referred to as solvents, resort has been had to those materials which have a stronger and more powerful action, such as halogenated organic compounds. The use of such materials frequently resulted in the corrosion of engine parts which, of course, was highly undesirable. The effect of simply increasing the amount of solvent additive has also been tried but this change generally results in increasing the deposit in the combustion zone, apparently as a result of carbonization of the solvent itself or as a result of the effect of the solvent action in the intake system, causing removal of the deposit there and the carrying of the deposit into the combustion zone where, due to the difference in conditions, such as temperature and pressure, deposition of material resulted and the deposit in the combustion zone increased.

We have discovered that if certain compounds are injected together in proper proportions into an engine in the manner hereinafter described, the gum and carbonaceous deposits which accumulate in the intake and combustion zones of internal combustion engines can be largely removed with the result that the octane requirement of the engine is considerably reduced. The efficiency of the engine is also improved to the point where it is in condition to operate with lower fuel consumption than before the injection of the aforesaid compounds. After the engine is placed in this improved condition, if the engine is run on gasoline containing our novel solvent the ability of the engine to run with lower fuel consumption is maintained. While the nature of the solvent effect of the proposed combinations is such as to be classed as very active, under the conditions which it is used, yet the material is non-corrosive and does not injure in any way the metal parts with which it comes in contact. The materials used in preparing the solvent in accordance with this invention are: (1) a compound or mixture of compounds boiling over 350° F. having excellent gum solvent properties at elevated temperatures and which may or may not have good gum solvent properties at ordinary temperatures, and which may be selected from the group consisting of esters of aliphatic dicarboxylic acids, esters of aromatic acids, cyclic, including aromatic, ketones and aliphatic alcohols; and (2) a compound or a mixture of compounds boiling below 350° F., having good solvent properties at ordinary temperatures, and which may be selected from the group consisting of esters of aliphatic acids, aliphatic alcohols and aliphatic ketones. As examples of the first group may be mentioned, amyl phthalate, benzyl benzoate, ethyl benzoate, dibutyl phthalate, butyl tartrate, butyl benzoate, benzophenone, acetophenone, furfuralacetone and octyl alcohol. Examples of the second group are ethyl butyl acetate, methyl amyl acetate, acetone, methyl amyl ketone, ethyl alcohol and ethyl acetate. The esters referred to are of that class of compounds that are true esters, i. e., an organic salt formed from an alcohol and an organic acid by elimination of water. The proportions of the various compounds indicated which may be used in such combinations of solvent materials may vary from 19 parts of a compound or mixture of compounds from group (1) as above defined, to 1 part of a compound or mixture of compounds from group (2) as above defined, to 1 part of the former to 19 parts of the latter, by volume. However, it is preferable to stay within the limits of from 17 parts of (1) to 3 parts of (2), to 3 parts of (1) to 17 parts of (2). The proportions which give best results vary somewhat with the different compounds but fall within the range set forth. Material from each of groups (1) or (2) should be present in the composition to the extent of at least 5% by volume and preferably 15% by volume.

Compositions in accordance with this invention in order to be most effective are injected into the engine to be treated when the engine is at normal driving temperature. The preferred method of injecting the solvent is to remove the air cleaner from the carburetor, and while the engine is running slightly faster than when idling, approximately eight ounces of the composition is injected into the throat of the carburetor. The ignition is then turned off and the spark plugs removed. Approximately eight more ounces of the composition is injected into the engine through the spark plug holes, the composition being approximately evenly divided among the cylinders. The engine is then allowed to stand for about 15 minutes and after having replaced the spark plugs, the engine is run for a short time with throttle partially open and then accelerated intermittently until the exhaust smoke clears up. The entire treatment requires approximately one-half hour.

When using the composition in the manner above described to eliminate deposits from the engine, it is advantageous to mix the ingredients of the solvent or treating composition with a vehicle. A suitable vehicle is a refined mineral oil fraction or a mineral oil distillate boiling within the range of approximately 350° to 850° F. Kerosene, gas oil and white mineral oil having a Saybolt viscosity between 65 and 75 at 100° F. are suitable vehicles. Other vehicles boiling within the range of 350–850° F. and either hydrocarbon or non-hydrocarbon may be used provided they have good penetrating and wetting characteristics with respect to the deposits. Pine oil is an example of such vehicles. The vehicle assists in thoroughly bringing the solvent composition into contact with the deposits which it is desired to remove and thereby enhances the effectiveness of the solvent composition in removing the depositions.

We have found a composition composed of 20% by volume of white mineral oil corresponding to that described on page 3, column 1, lines 18–26, 40% of dibutyl phthalate and 40% of ethyl acetate, to be very effective. The quantity of vehicle may be more or less than 20% by volume of the solvent composition but it has been ascertained that this amount is approximately the optimum amount for best results when the solvent is injected directly into the motor. However, where the solvent is incorporated as an additive in gasoline or other motor fuel of similar boiling range, it has been found necessary to incorporate larger amounts of the vehicle to obtain satisfactory results and the vehicle should have a boiling range higher than that of kerosene distillate and a viscosity preferably between 70 and 500 seconds Saybolt Universal at 100° F. When the solvent is incorporated in the motor fuel as an additive, the ingredients in the solvent should be maintained within certain definite ratios to obtain satisfactory results but may be varied within the limits of at least 50% by volume of vehicle (mineral oil or other equivalent material of required boiling range, viscosity, penetrating and wetting characteristics), 5% to 15% of one or more compounds selected from group (2) and the remainder being composed of at least 5% of one or more compounds from group (1).

The quantity of such mixture which, when added to motor fuel, is necessary to effectively remove and/or minimize gum and carbon deposits may vary considerably depending on the type of engine, condition of engine, the particular fuel employed, and the operating conditions eencountered. A maximum of 5% and usually not over 1% of solvent, based on the volume of motor fuel, is sufficient. In general, it has been found that from 0.1% to 0.5% of solvent gives satisfactory results. The amount of solvent to be used will vary, within the limits specified, with different engines and with the type of service to which the engine is subjected. It has been found by experiment that, in some cases, deviation from the proportions specified noticeably diminishes the efficacy of the solvents as indicated by an increase in the deposit in the combustion zone.

As a specific example of a preferred combination of solvent additive, 80 parts by volume of a highly refined white mineral oil having the following characteristics:

| | |
|---|---|
| S. U. viscosity at 100° F | 75–75 |
| Color, Saybolt | 25 |
| Flash (C. O. C.) °F | 350–360 |
| Fire °F | 400–420 | is blended with ten parts dibutyl phthalate and ten parts ethyl acetate. This mixture is added to gasoline in the proportion of 99.8% gasoline and 0.2% solvent mixture. When this gasoline-solvent fuel mixture is used in internal combustion engines, it effectively minimizes the tendency toward formation of gum and carbon deposits in both the intake system and combustion zone and in those engines where deposits of gum and carbon are already present and are interfering with efficient operation, the deposits are substantially decreased and/or removed, restoring the engine to higher operating efficiency.

The following tabulation of data indicates the nature of the results obtained by the use of combinations of solvents as an additive to motor fuel in the percentages by volume indicated.

| | | Oil free deposit in combustion chamber | Deposit in intake system | Total deposit |
|---|---|---|---|---|
| | | Grams | Grams | Grams |
| 1 | Blank | 32.4 | 21.7 | 54.1 |
| 2 | 0.16% mineral oil | 32.7 | 12.6 | 45.3 |
| 3 | 0.18% {88% mineral oil / 12% ethyl acetate} | 32.0 | 11.6 | 43.6 |
| 4 | 0.18% {88% mineral oil / 12% dibutyl phthalate} | 30.1 | 10.5 | 40.6 |
| 5 | 0.2% {80% mineral oil / 10% dibutyl phthalate / 10% ethyl acetate} | 27.2 | 4.8 | 32.0 |
| 6 | Blank | 36.3 | 2.1 | 38.4 |
| 7 | 0.2% {80% mineral oil / 10% benzophenone / 10% ethyl acetate} | 25.4 | 1.7 | 27.1 |
| 8 | Blank | 28.5 | 2.8 | 31.3 |
| 9 | 0.2% {80% mineral oil / 10% furfuracetone / 10% ethyl acetate} | 22.5 | 1.9 | 24.4 |

The above tests were made on stock motors mounted on tests blocks and connected to a dynamometer. Runs 1–5 were made with a regular grade of commercial gasoline which had been pre-gummed. Runs 6–8 were made with a regular grade of commercial gasoline. In each case a blank run was made in which all conditions were identical with the conditions of the subsequent test run except the addition of the solvent to the fuel.

The figures shown are in grams of deposit obtained from the combustion chamber and intake systems. The intake system deposit comprised all material found up to and including the intake side of the intake valves. The deposits in all cases were carefully scraped from the engine parts until the metal was bare, and were then collected and weighed. In the case of the combustion chamber deposits the material was extracted with light petroleum fraction to eliminate irregularities due to varying amounts of oil present in the deposits.

Although the data indicate to some extent the improvement in engine conditions effected, the full extent of the beneficial results obtained can only be completely appreciated when considered together with visual appearance of the intake and combustion areas and motor performance. Photographs taken of the affected areas of the engine after blank runs and after runs made with fuel containing solvent show that the combustion zone was conspicuously improved both as to a reduction in quantity and as to character of deposit. Instead of being hard and of such a nature as would be continuously built up to such a point as would ultimately seriously interfere with engine operations, the deposit was not only reduced in quantity but was soft and flaky and parts of the metal were entirely bare, indicating that after a small amount of deposit accumulated it did not adhere to the metal and consequently passed out of the motor in the exhaust gases. A great improvement in the condition of the intake system was also apparent from a visual inspection and photographs of the areas generally affected, particularly the intake valve ports and stems. On the blank runs the intake valve stems and guides were coated with a deposit of such a nature as to materially interfere with lubrication and to cause sticking. This condition was not present in those runs in which the solvents were used. It was also observed during the course of laboratory tests, that the engines ran much quieter when operating on a fuel which contained the gum and carbon solvent. The difference in engine performance, with and without the solvent, indicates that the octane number of the fuel required to produce a given standard of performance is lowered as a result of the use of the solvent in the fuel.

Additional evidence of the unusually effective action of the solvents was obtained using a combination of 80 parts mineral white oil, 10 parts dibutyl phthalate and 10 parts ethyl acetate as the solvent. This was added in an amount of 0.2% to the motor fuel. The test consisted of operating a stock commercial automotive engine mounted on a test block and connected to a dynamometer, using a high gum content gasoline as a fuel until the engine was so full of deposit that the valves would not function. The motor was taken apart, photographs made of the affected parts and the motor reassembled. A regular grade of a commercial gasoline was then used as a fuel until fifty gallons of fuel had been consumed. Although the motor was able to operate on this fuel, it missed fire badly throughout the run and the power output was low. The motor was again taken apart and photographs obtained. The motor was then cleaned, reassembled and operated, using the same quantity of high gum content gasoline as a fuel until the engine was so full of deposit the valves would not function, and photographs again taken. After reassembling, the motor was again operated, using the same commercial gasoline as was used in the previous test but to which had been added 0.2% of the solvent mixture. Within twenty minutes the motor was no longer missing fire and for the duration of the run the power output was high and no difficulty with the engine missing fire was encountered. Photographs were again taken to show the improved condition of the intake system and combustion zone.

Figure 1 demonstrates by means of curves the increase or decrease in octane requirement of an internal combustion engine on dynamometer block test, at different speeds over a long period of time resulting from the use of a good grade of straight commercial gasoline, and the same gasoline containing ethyl acetate, dibutyl phthalate, white mineral oil, and our novel solvent. In each case the additive was added to the gasoline in the amount of .2% by volume of the gasoline. The points on the curves were obtained by applying a dynamometer load to the engine on the block as described on the last page of the article entitled "Engine deposits" by Joseph A. Moller and Harry L. Moir, appearing at pages 250 to 261, inclusive, of the June, 1940, issue of the S. A. E. Journal. At the intervals indicated on the drawings, the supply of fuel indicated on the drawings was cut off and a series of reference fuels of known octane number fed to the engine. For each reference fuel, the engine was gradually loaded and unloaded and the speed at which knocking came in during loading and faded out during unloading was determined. The average of these two speeds was plotted against the octane number of the reference fuel for each fuel. A curve was then drawn through these points and from the curve the octane requirement at any desired speed could be determined. By plotting these octane requirements obtained periodically, the curves shown in Figure 1 were obtained.

It will be seen from the curves that the octane requirement of the engine gradually increased over a period of time of ten hours when run on straight commercial gasoline. When the engine was run for eight hours on the same gasoline containing .2% by volume of ethyl acetate, the octane requirement of the engine jumped considerably in each instance, indicating that ethyl acetate alone is a deleterious ingredient of gasoline.

After a test period lasting for eight hours on ethyl acetate, the fuel was changed over to gasoline containing dibutyl phthalate and a test run for a period of ten hours. The dibutyl phthalate immediately caused a reduction in the octane requirement of the engine to a point approximating the octane requirement of the engine after three hours running of straight gasoline.

The engine was then run for a period of twenty hours on gasoline containing white mineral oil having a Saybolt viscosity at 100° F. of 65 to 75. The white mineral oil had the effect of lowering the octane requirement of the engine below that of the engine when operated on gasoline-dibutyl phthalate mixture.

The engine was then run for a period of twenty-six hours or less on gasoline containing the solvent described in lines 19 to 29 of page 3 and a pronounced decrease in octane requirement of the engine was obtained below that obtained with gasoline plus white mineral oil. It will be observed that the decrease in octane requirement when using the solvent is greater than the sum of the reductions in octane requirements of any combination of the individual ingredients which go to make up the solvent. This fact is all the more notable when it is considered that only .2% by volume of the solvent was used, whereas the combined amount of the three ingredients when used individually is .6% by volume. When individual tests were run on gasoline containing ethyl acetate and dibutyl phthalate using the small amounts which are added when the solvent is used, no noticeable difference in octane requirement could be observed from that of the straight gasoline.

The curves of Figure 1 show another interesting fact. Whereas, with the individual constituents, the maximum effect of the ingredient in the motor fuel on octane requirement of the engine was reached in a comparatively short time, the improvement experienced when using our novel solvent was progressive over a relatively long period of time. As a matter of fact, at the higher speeds, namely, 2300 and 2400 R. P. M. the engine could not be made to knock on fuels containing our novel solvent, after a few hours of operation with the fuel. That fact accounts for the stopping of these curves at 61 and 53 hours, respectively.

Figure 2 shows the effect in the form of curves, on the octane requirement of an automobile engine on road tests of a good grade of commercial gasoline, of a solvent treatment as hereinbefore described, and of the same gasoline containing our novel solvent described on page 3, column 1, lines 19 to 29, in amounts of two-tenths of 1%. These curves were obtained in the manner described on the last page of the article entitled "Engine deposits" by Joseph A. Moller and Harry L. Moir, appearing at pages 250 to 261, inclusive, of the June, 1940, issue of the S. A. E. Journal. The points on the curves were obtained by accelerating the automobile with a reference fuel of known value and determining the speed at which knock faded out. This speed was obtained for a series of reference fuels of different octane numbers and the speeds were plotted against the octane numbers of the fuels. A curve was drawn through these points and from the curve the octane requirement for any given speed can be determined. Octane requirement tests on the engine which was clean when the tests started, were made at approximately five hundred mile intervals, although this varied somewhat. From these tests and the resulting curves drawn, the points on the curves shown in Figure 2 were obtained.

At the 4354 mileage point the automobile engine was given a solvent treatment with sixteen ounces of the solvent disclosed on page 2, column 2, lines 46 to 48, in the manner heretofore described. The octane requirement of the engine was lowered approximately 2 to 3 octane numbers, depending on the particular speed. After the solvent treatment the automobile engine was operated on gasoline containing 0.2% by weight of the novel solvent disclosed on page 3, column 1, lines 19 to 31, for a distance of approximately 2200 miles and as the curves show, the solvent over this distance held the octane requirement of the engine close to the octane requirement of the clean engine.

The automobile was then operated on straight gasoline again for a distance of 1358 miles and, as shown, the octane requirement of the engine quickly increased.

The numerous tests run, as illustrated by the curves in Figure 2, demonstrated that the octane requirement of the automobile engine from mile to mile, when running on straight gasoline, varied considerably more than when operated with gasoline containing our novel solvent. Note how the curve for straight gasoline zig-zagged, whereas the gasoline-solvent curve is relatively straight.

These curves demonstrate the ability of the solvent to remove and the ability of gasoline containing solvent to prevent increase of carbonaceous and gum deposits in internal combustion engines.

Although the use of our novel gum solvents has been more particularly described in connection with removal of gum and carbonaceous deposits from the intake and combustion zones of automotive engines and in connection with motor fuels, it is to be understood that the solvents are useful as additives to motor oils and to lubricating oils in general where the problem of gum and carbon deposition is encountered. For example, when added in amounts ranging from 1% to 5% to motor oils, depositions of carbon on the piston rings are substantially minimized and removed. Likewise, gum deposition is substantially avoided when the gum solvents are used in the same proportions in industrial lubricating oils as, for example, spindle oils. When used in connection with lubricating oils, the solvent does not require the addition of vehicles since the oil itself acts as a vehicle.

The foregoing general description of the invention and the specific examples described are sufficient to enable one skilled in the art to appreciate its value. The invention is not limited to the specific examples disclosed or to any particular theory or mechanism of the action of the gasoline additive but is to be interpreted as broadly as the prior art permits in view of the following claims.

We claim:

1. A composition useful as a gum solvent for deposits in internal combustion engines comprising a substantial portion of refined mineral oil boiling above the boiling range of kerosene, a minor portion but not less than 5% of material boiling above 350° F. having gum solvent properties at elevated temperatures and selected from the group consisting of esters of aliphatic dicarboxylic acids, esters of aromatic acids, cyclic including aromatic ketones, and aliphatic alcohols and a minor portion not less than 5% of material boiling below 350° F. having gum solvent properties at normal temperature and selected from the group consisting of aliphatic esters, aliphatic ketones and aliphatic alcohols.

2. A composition useful as a gum solvent for deposits in internal combustion engines comprising a substantial portion of refined mineral oil boiling above the boiling range of kerosene, a minor portion but not less than 5% of an ester of an aromatic acid boiling above 350° F. having gum solvent properties at elevated temperatures, and a minor portion not less than 5% of an aliphatic acid ester boiling below 350° F. having gum solvent properties at normal temperatures.

3. A composition in accordance with claim 2 in which the ester of an aromatic acid is an ester of phthalic acid.

4. A composition in accordance with claim 2 in which the aliphatic acid ester is an ester of acetic acid.

5. A composition in accordance with claim 2 in which the ester of an aromatic acid is an ester of phthalic acid and the aliphatic acid ester is an ester of acetic acid.

6. A composition in accordance with claim 1 in which the ester of aromatic acid is dibutyl phthalate and the aliphatic acid ester is ethyl acetate.

7. A composition useful for removing deposits from internal combustion engines comprising a substantial proportion of a material boiling above 350° F. having gum solvent properties at elevated temperatures selected from group (1) consisting of esters of aliphatic dicarboxylic acids, esters of aromatic acids, cyclic ketones, including aromatic ketones, and aliphatic alcohols, a substantial proportion of a material boiling below 350° F. having gum solvent properties at normal temperatures and selected from group (2) consisting of aliphatic esters, aliphatic ketones and aliphatic alcohols, the total quantity of materials from groups (1) and (2) amounting to at least 50% by volume of the total composition while the quantity of each of said materials individually is at least about 15 per cent by volume, and a substantial quantity of a highly refined mineral oil boiling between 350 and 850° F. having good penetrating and wetting characteristics with respect to said deposits.

8. A composition in accordance with claim 7 in which the group (1) material is an aliphatic ester of phthalic acid, the group (2) material is an aliphatic ester of acetic acid and the mineral oil is a white lubricating oil.

9. A composition in accordance with claim 7 in which the group (1) material is dibutyl phthalate, the group (2) material is ethyl acetate and the mineral oil is a white oil having a viscosity between 70 and 75 seconds at 100° F. Saybolt Universal.

10. A composition useful as a gum solvent for deposits in internal combustion engines comprising a substantial portion of refined mineral oil boiling above the boiling range of kerosene, a minor portion but not less than 5% of an ester of an aromatic acid boiling above 350° F. having gum solvent properties at elevated temperatures, and a minor portion not less than 5% of an aliphatic ketone boiling below 350° F. having gum solvent properties at normal temperature.

11. A composition in accordance with claim 10 in which the ester of aromatic acid is an ester of phthalic acid.

12. A composition in accordance with claim 10 in which the aliphatic ketone is acetone.

13. A composition in accordance with claim 10 in which the ester of aromatic acid is dibutyl phthalate and the aliphatic ketone is acetone.

14. A composition useful as a gum solvent for deposits in internal combustion engines comprising a substantial portion of refined mineral oil boiling above the boiling range of kerosene, a minor portion but not less than 5% of an ester of an aromatic acid boiling above 350° F. having gum solvent properties at elevated temperatures and a minor portion not less than 5% of aliphatic alcohol boiling below 350° F. having gum solvent properties at normal temperatures.

15. A composition in accordance with claim 14 in which the ester of aromatic acid is an ester of phthalic acid.

16. A composition in accordance with claim 14 in which the aliphatic alcohol is ethyl alcohol.

17. A composition in accordance with claim 14 in which the ester of aromatic acid is dibutyl phthalate and the aliphatic alcohol is ethyl alcohol.

18. A motor fuel comprising hydrocarbons boiling within the gasoline boiling range containing from 0.1 to 5% of a mixture containing 50% to 90% of refined mineral oil boiling above the kerosene boiling range, not less than 5% of oxygen-containing material boiling above 350° F. having gum solvent properties at elevated temperature and selected from the group consisting of esters of aliphatic dicarboxylic acids, esters of aromatic acids, cyclic including aromatic ketones and aliphatic alcohols, and 5% to 15% of an oxygen-containing material boiling below 350° F. having gum solvent properties at normal temperature and selected from the group consisting of aliphatic esters, aliphatic ketones and aliphatic alcohols.

19. A motor fuel in accordance with claim 18 in which the oxygen-containing material boiling above 350° F. is an ester of an aromatic acid and the oxygen-containing material boiling below 350° is an aliphatic ester.

20. A motor fuel in accordance with claim 18 in which the oxygen-containing material boiling above 350° F. is an ester of phthalic acid and the oxygen-containing material boiling below 350° F. is an ester of acetic acid.

21. A motor fuel in accordance with claim 18 in which the oxygen-containing material boiling above 350° F. is dibutyl phthalate and the oxygen-containing material boiling below 350° F. is ethyl acetate.

22. A motor fuel comprising chiefly hydrocarbons boiling within the gasoline boiling range and a gum solvent comprising from 0.1% to 5% of a mixture of refined mineral oil boiling above the boiling range of kerosene, ester of aromatic acid boiling above 350° F. having gum solvent properties at elevated temperatures, and aliphatic ketone boiling below 350° F. having gum solvent properties at normal temperatures, the proportions of refined mineral oil, ester of aromatic acid and aliphatic ketone being 50% to 90% of refined mineral oil, not less than 5% of ester of aromatic acid and between 5% and 15% of aliphatic ketone, the percentages being based on the total volume of gum solvent present.

23. A motor fuel in accordance with claim 22 in which the ester of aromatic acid is dibutyl phthalate and the aliphatic ketone is acetone.

24. A motor fuel comprising chiefly hydrocarbons boiling within the gasoline boiling range and a gum solvent comprising from 0.1% to 5% of a mixture of refined mineral oil boiling above the boiling range of kerosene, ester of aromatic acid boiling above 350° F. having gum solvent properties at elevated temperatures, and aliphatic alcohol boiling below 350° F. having gum solvent properties at normal temperatures, the proportions of refined mineral oil, ester of aromatic acid and aliphatic alcohol being 50% to 90% of refined mineral oil, not less than 5% of ester of aromatic acid and between 5% and 15% of aliphatic alcohol, the percentages being based on the total volume of gum solvent present.

25. A motor fuel in accordance with claim 24 in which the ester of aromatic acid is dibutyl phthalate and the aliphatic alcohol is ethyl alcohol.

26. The method of removing gum and carbon deposits from internal combustion engines which comprises injecting into said engine the following materials in the following proportions: (1) a substantial portion of refined mineral oil boiling above the kerosene range; (2) oxygen-containing material boiling above 350° F. having gum solvent properties at elevated temperatures and selected from the group consisting of esters of aliphatic dicarboxylic acids, esters of aromatic acids, cyclic including aromatic ketones and aliphatic alcohols—not less than 5%; (3) oxygen-containing material boiling below 350° F. having gum solvent properties at normal temperatures and selected from the group consisting of aliphatic esters, aliphatic ketones and aliphatic alcohols—a minor portion not less than 5%.

27. The method in accordance with claim 26 in which the oxygen-containing material boiling above 350° F. is an ester of phthalic acid and the oxygen-containing material boiling below 350° F. is an ester of acetic acid.

28. A mineral lubricating oil for automotive engines containing approximately 1% to 5% of a mixture of the following materials in the following proportions: (a) ester of phthalic acid boiling above 350° F. and having gum solvent properties at elevated temperatures—not less than 5%; (b) ester of acetic acid boiling below 350° F. having gum solvent properties at normal temperatures—a minor proportion not less than 5%.

29. A mineral lubricating oil for automotive engines containing 1% to 5% of a mixture of the following materials in the following proportions: (1) oxygen-containing material boiling above 350° F. having gum solvent properties at elevated temperatures and selected from the group consisting of esters of aliphatic dicarboxylic acids, esters of aromatic acids, cyclic including aromatic ketones and aliphatic alcohols—not less than 5%; (2) oxygen-containing material boiling below 350° F. having gum solvent properties at normal temperatures and selected from the group consisting of aliphatic esters, aliphatic ketones and aliphatic alcohols—a minor portion not less than 5%.

WILLIAM J. BACKOFF.
NORMAN D. WILLIAMS.
JOHN S. YULE.
HARRY L. MOIR.
JOHN F. O'LOUGHLIN.